United States Patent [19]
Hanninen

[11] Patent Number: 5,423,071
[45] Date of Patent: Jun. 6, 1995

[54] MONITORING AND ALARM CIRCUITRY FOR A BASE STATION TRANSMITTING SUPERVISING SIGNALS TO ONE OR MORE MOBILE RADIO STATIONS

[75] Inventor: Jouni Hanninen, Kiiminki, Finland

[73] Assignee: Telenokia Oy, Espoo, Finland

[21] Appl. No.: 867,187

[22] PCT Filed: Oct. 31, 1991

[86] PCT No.: PCT/FI91/00328
§ 371 Date: Jul. 1, 1992
§ 102(e) Date: Jul. 1, 1992

[87] PCT Pub. No.: WO92/08299
PCT Pub. Date: May 14, 1992

[30] Foreign Application Priority Data
Nov. 2, 1990 [FI] Finland ................... 905446

[51] Int. Cl.$^6$ ............................. H04B 17/00
[52] U.S. Cl. ..................... 455/67.3; 455/44; 455/115
[58] Field of Search ............... 455/62, 125, 116, 119, 455/9, 33.1, 44, 54.1, 56.1, 67.1, 67.3, 69, 113, 115, 126, 226.1, 226.3, 185.1, 186.1, 67.4

[56] References Cited
U.S. PATENT DOCUMENTS
4,870,699 9/1989 Garner et al. ............... 455/67.1
4,910,791 3/1990 Dickinson et al. ........... 455/115

FOREIGN PATENT DOCUMENTS
353759 2/1990 European Pat. Off. .

OTHER PUBLICATIONS
Patent Abstracts of Japan, vol. 11, No. 314, E549, Abstract of JP 62-108624, publ 1987.
Derwent's abstract No. G90 38 D/30, SU 767 980, publ week 8130.
Patent Abstracts of Japa, vol. 9, No. 3212, E367, abstracts of JP 60-153232, publ 1985.

Primary Examiner—Reinhard J. Eisenzopf
Assistant Examiner—Nguyen Vo
Attorney, Agent, or Firm—Cushman Darby & Cushman

[57] ABSTRACT

A base station is provided which supervises the quality of a radio link and including a generator circuit for generating a supervising signal having a desired baseband frequency, a measuring circuit for monitoring the level of the baseband supervising signal, and a transmitting circuit for frequency-modulating a transmitting-frequency carrier of said baseband supervising signal. The measuring circuit comprises an A/D converter for deriving digital sample values from the baseband supervising signal, and a control circuit which monitors the deviation of sample values from that of a digital sample value corresponding to a supervising signal level causing a desired deviation in the output signal of the transmitting circuit on the basis of at least one reference value stored in a memory in connection with the calibration so that the deviation is no more than a predetermined difference value.

5 Claims, 2 Drawing Sheets

MONITORING AND ALARM CIRCUITRY FOR A BASE STATION TRANSMITTING SUPERVISING SIGNALS TO ONE OR MORE MOBILE RADIO STATIONS

BACKGROUND OF THE INVENTION

1. Field of the Invention

The present invention relates to a base station for a radio system, the base station supervising the quality of a radio link between the base station and mobile stations, and includes a generator circuit for generating a supervising signal having a desired baseband frequency; a measuring circuit for monitoring the level of the baseband supervising signal; a transmitting circuit for frequency-modulating a transmitting-frequency carrier of the baseband supervising signal and transmitting it to the mobile radio station, a receiving circuit for detecting the supervising signal transmitted back from the mobile radio station and modulating it to a receiving frequency; and a signal processing circuit for determining the quality of the used radio link.

2. Description of the Related Art

In the NMT (Nordic Mobile Telephone) mobile telephone system, the quality of the radio link between a base station and a mobile telephone is supervised by special supervising signals. The base station generates a supervising signal, e.g. by lowpass-filtering from a clock signal having a desired supervising signal frequency. The NMT system utilizes four supervising signal frequencies with spacings of 30 Hz. The base station transmits a supervising signal to the mobile telephone, which returns the supervising signal immediately to the base station, and the base station determines the quality of the used radio link, especially the signal-to-noise (S/N) ratio, by way of the received supervising signal.

When the level of the baseband supervising signal generated at the base station changes for some reason before transmission, this change in level appears as a number of deviation variations in the radio-frequency signal transmitted from the base station to the mobile telephone and frequency-modulated by the supervising signal and also affects the measuring accuracy of the S/N ratio of the radio link. In order to ensure that the measured S/N ratio describes the quality of the radio link sufficiently accurately, the NMT specifications define that the deviation caused by the supervising signal must not deviate from a set value by more than 10%. Today the level of the supervising signal is monitored by a measuring circuit comprising a rectifier and comparators, for which appropriate threshold voltages corresponding to the lowest and the highest allowable level of the supervising signal are set by a calibration circuit including adjustable resistors. Such a measuring circuit is, however, slow and difficult to calibrate, as it requires at least two adjusters and four adjusting procedures.

SUMMARY OF THE INVENTION

The object of the present invention is to provide a base station having a more accurate, more reliable, and more easily calibrateable control of the supervising signal level.

In the first embodiment of the invention, this is achieved by a base station provided with a measuring circuit comprising an A/D converter for deriving digital sample values from the baseband supervising signal. A control circuit is also provided which controls, on the basis of at least one reference value stored in a memory in connection with the calibration, a difference between the sample values and a digital sample value, corresponding to a supervising signal level causing a desired deviation in a output signal of the transmitting circuit, is no more than a predetermined difference value.

In the preferred embodiment of the invention, a microprocessor used as the control circuit calculates alarm limit values from a reference value stored in the memory in the calibration of the supervising signal, the reference value being a digital sample value provided by the A/D converter from a supervising signal level causing a desired deviation. During the calibration of the level of the supervising signal, the microprocessor is merely indicated when the measured deviation caused by the supervising signal is such as desired, whereby the microprocessor stores the sample value obtained by the A/D converter in its memory as the above-mentioned reference value. The invention thus requires no manual adjustments. In addition, such a digital comparison is inherently more accurate, stable in time and more insensitive to temperature changes.

In another embodiment of the invention, the microprocessor compares digital samples with reference values stored in the memory in the calibration of the supervising signal, the reference values being digital sample values obtained by the A/D converter from the supervising signal levels causing the smallest and the largest allowable deviation. In the calibration of the supervising signal, it is necessary in this version to separately determine the supervising signal levels corresponding to the smallest and the largest allowable deviation, and the microprocessor then stores the sample values corresponding to these signal levels in its memory as alarm limit values. This embodiment requires more calibration steps than the preceding one; it, however, avoids difficult manual adjustments.

In a further embodiment of the invention, the measuring device measuring deviation indicates the control circuit directly when the deviation is such as desired. In still another embodiment, the control circuit controls a supervising signal generator on the basis of the deviation information it receives from the measuring device in such a way that the desired deviation is achieved. Thus the whole calibration takes place automatically and can be initiated by remote control from outside the base station, if desired.

BRIEF DESCRIPTION OF THE DRAWINGS

The invention will now be described in greater detail by reference to the accompanying drawings, in which.

DETAILED DESCRIPTION OF THE PREFERRED EMBODIMENTS

The NMT mobile telephone system (Nordic Mobile System) is a so-called cellular telephone system in which the geographical area covered by the system is divided into smaller adjoining geographical areas or cells, each containing one ore more fixed base stations in communication with mobile telephones within the cell. The structure of the NMT system will not be described in more detail in this connection but the following publications are referred to in this respect:

[1] NMT Doc.4.1981 Technical specification for the base station equipment

[2] NMT Doc. 900-4 Technical specification for the base station equipment

[3] Addendum to NMT Doc. 900-4 Revised 1988-04-01.

[4] NMT Doc. 900-1.

The above specifications are also referred to regarding signalling between the base station and the mobile telephone and especially regarding the supervising signal.

Figure 1:
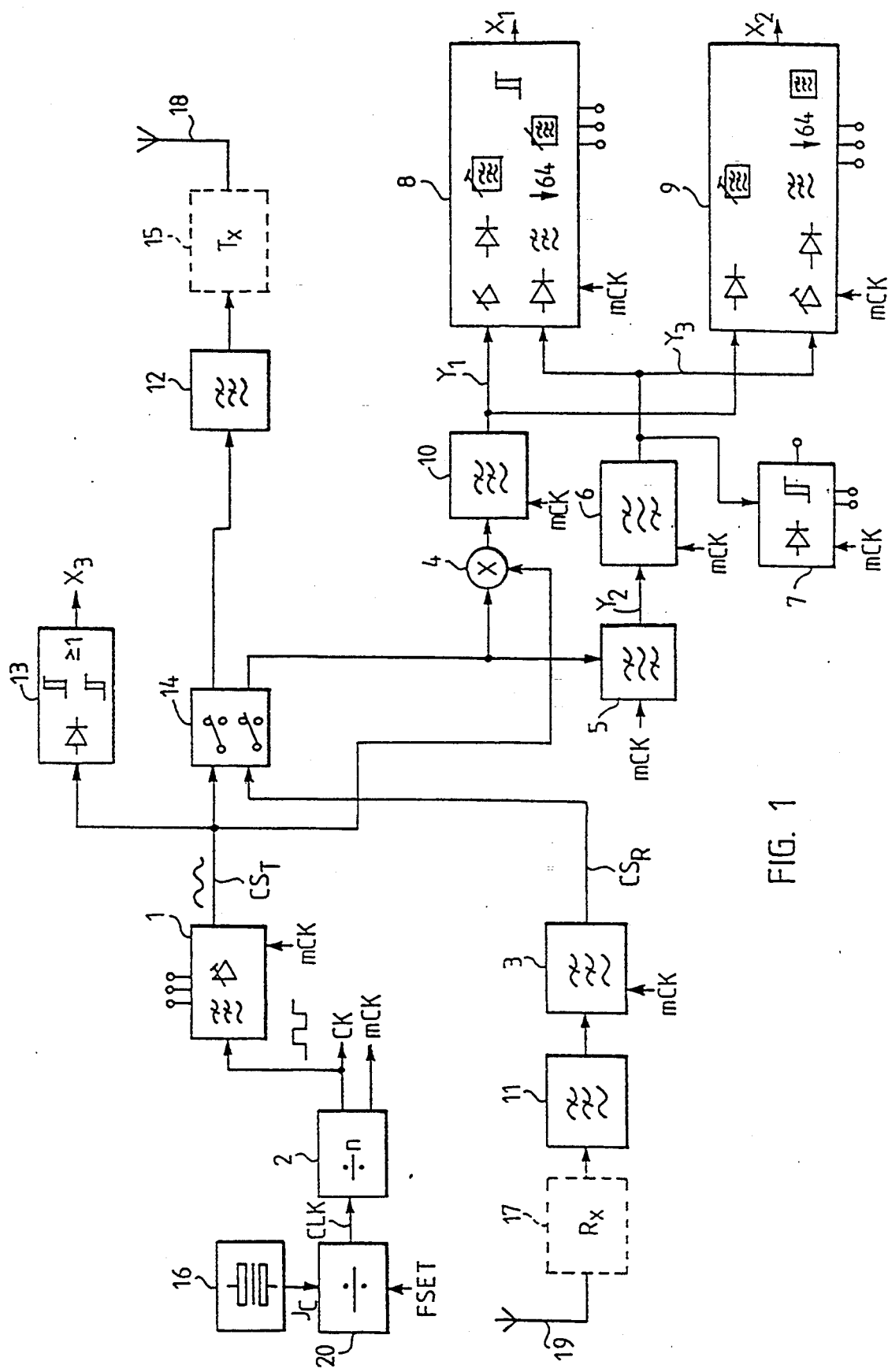
FIG. 1 shows a block diagram of a base station section required for processing supervising signals.

Referring to FIG. 1, the generation of the supervising signal at the base station will be discussed first. The base station comprises a source generating a clock signal, such as a crystal oscillator 16 which applies a clock signal $f_c$ to an adjustable divider circuit 20. The divider circuit 20 divides the clock signal $f_c$ by a divisor term determined by a frequency setting signal FSET to produce a main clock signal CLK. The main clock signal CLK is divided by a fixed divider circuit 2 which produces a supervising-signal-frequency square wave signal CK and one or more filtering clock signals mCK having preferably a frequency which is the multiple of the frequency of the signal CK. The square wave signal CK is lowpass-filtered by a lowpass-filtering block 1 containing a Switched capacitor lowpass filter and a level adjustment. The SC filter is controlled by the clock signal mCK, whereby its cut-off frequency is adapted automatically to the frequency of the square wave signals. The output signal of the filtering block 1 is a sinusoidal supervising signal $CS_T$, which during normal operation is applied through a switching unit 14 to a continuous lowpass filter 12, which filters the clock signal mCK out of the supervising signal. The output signal of the filter 12 is applied to a transmitting unit 15 at the base station for transmission through a transmitting antenna 18 to a mobile radio station.

The supervising signal $CS_T$ is also applied to a level indicator 13 which monitors the level of the supervising signal, thus ensuring that it is in a window defined between predetermined limit values. If the level of the supervising signal falls outside this window, the indicator 13 generates an alarm signal $X_3$.

The supervising signal returned from the mobile station and received at the base station by a receiving antenna 19 and a receiver section 17 is applied through filters 11 and 3 and the switching unit 14 to a signal processing circuitry comprising a mixer 4; filters 5, 6 and 10; signal processing blocks 8 and 9; and a level indicator 7, which signal processing circuitry indicates the frequency of the supervising signal and measures the S/N ratio.

The structure and operation of the equipment described above are described more closely in Finnish Patent Application 900620.

Figure 2:
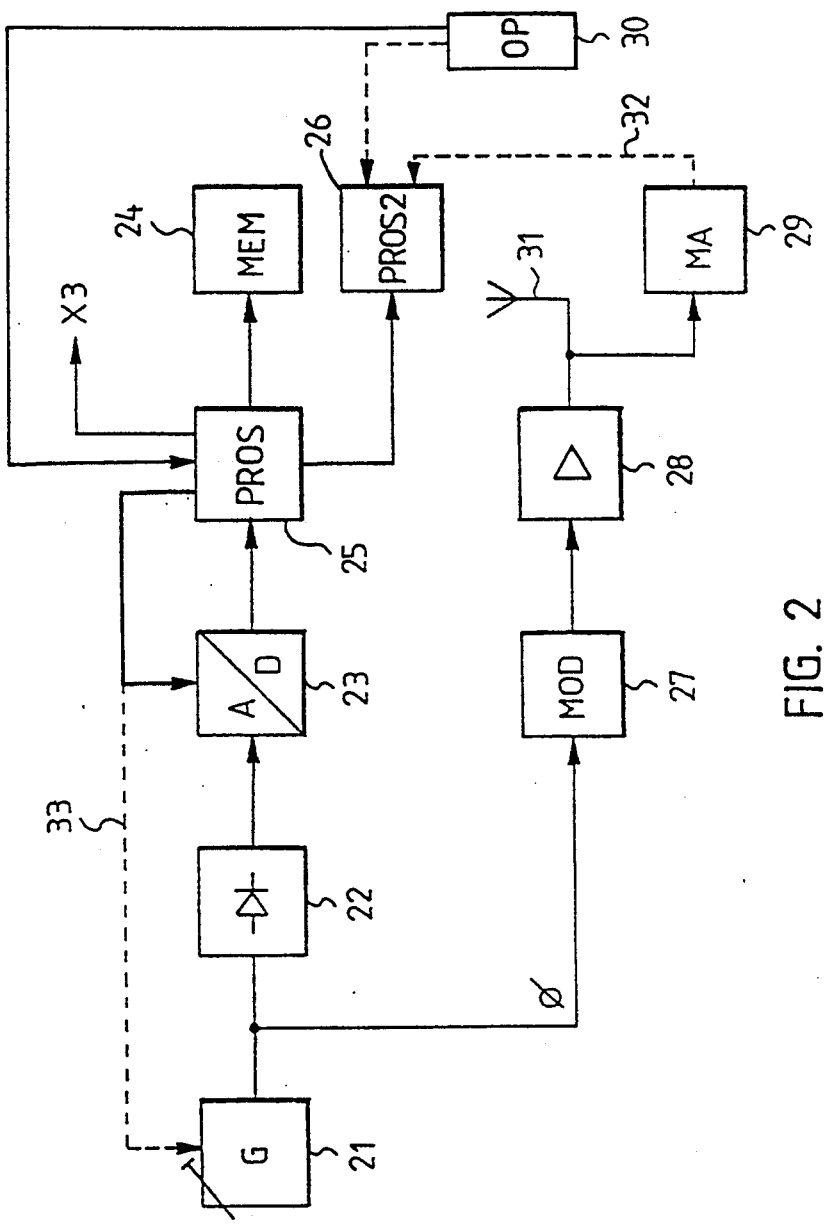
FIG. 2 shows a measuring circuitry according to the invention for monitoring the level of the supervising signal and required calibration equipment.

The present invention relates mainly to the realization of the level supervising circuitry 13 and the calibration of the level of the supervising signal. FIG. 2 shows a block diagram illustrating the principal features of the base station equipment required for the purpose. A generator block 21 illustrates generally the generation of the supervising signal and may contain e.g. the components 1, 2, 16 and 20 disclosed in connection with FIG. 1.

The output of the generator block 21 is connected to a modulating input in a frequency modulator 27. The transmitting-frequency frequency-modulated output signal of the modulator 27 is applied through a high-frequency amplifier 28 to a transmitting antenna 31. The output of the generator block 21 is further connected through a rectifier 22 to an analog input in an analog-to-digital converter 23. The operation of the A/D converter 23 is controlled by a microprocessor 25 which reads at regular intervals a digital sample value derived by the A/D converter 23 from the voltage level of the supervising signal and compares it with a reference value stored in an electronic memory 24, the reference value being a digital sample value derived by the A/D converter from the voltage level of the supervising signal causing a desired deviation in the output signal of the modulator. The microprocessor 25 generates an alarm signal X3 if the sample value derived from the supervising signal during the operation of the quality control of the radio link deviates from said reference values by more than a predetermined difference value. This difference value is preferably ±10% of the reference value. The microprocessor 25 calculates automatically the alarm limits from the stored reference value. The alarm limits may be calculated each time the comparison is made; alternatively, they can be stored in the memory 24 after the first calculation, whereby the sample values can subsequently be compared directly with these stored alarm limits.

To calibrate the voltage level of an outgoing supervising signal, a modulation analyzer, such as Hewlett-Packard HP 8903, is connected to the output of the modulator 27 or the high-frequency amplifier 28 for measuring a frequency deviation caused by the voltage level of the modulating baseband supervising signal in the outgoing radio-frequency signal. In the simplest calibration system, the voltage level of the supervising signal generated by the generator 21 is adjusted manually until the modulation analyzer 29 indicates that the deviation caused by the supervising signal is such as desired. Thereafter the performer of the calibration applies a control signal from an operating device 30, such as a service monitor, to the microprocessor to indicate that the calibration of the deviation and the voltage level of the supervising signal is completed. On receiving the control signal, the microprocessor 25 reads from the A/D converter 23 a digital sample value corresponding to the present voltage level of the supervising signal and stores this sample value in the memory 24 for use as the above-mentioned reference value.

In the figure, the operating device 30 is connected to the microprocessor 25 through another microprocessor 26 which controls the operation of all speech and control channel units of the base station in a centralized manner. Each channel unit comprises its own supervising signal generation, signal processing and level supervising circuitry.

In the other embodiment of the invention, the modulation analyzer 29 may be connected through the microprocessor 26 to the microprocessor 25, as is shown by a broken line 32. The analyzer 29 may thus directly indicate the microprocessor of the completion of the calibration of the deviation and the supervising signal level in a desired manner, and thus initiate the storage procedure described above. The microprocessor 25 may further control the generator 21 automatically in response to the deviation information it receives from the analyzer 29 so as to cause it to change the voltage level of the supervising signal in such a way that the desired deviation is achieved. It is thereby possible to carry out the calibration by remote control from outside the base station.

Alternatively, the microprocessor 25 may monitor the level of the supervising signal by comparing the digital samples it reads from the A/D converter 23 directly with alarm limit values stored in the memory 24 which are also digital sample values derived from the supervising signal levels causing the smallest and the largest allowable deviation. The calibration can again be carried out by any one of the above-described calibration systems, except that the supervising signal level now first has to be adjusted to the values causing the smallest and the largest allowable deviation before the actual calibration to the nominal value to derive digital sample values from these voltage levels and to store them in the memory 24 as the above-mentioned alarm limits. This alternative solution thus requires more adjustments than the above-described preferred embodiment.

The rectifier 22 is not necessary in the measuring circuit but it can be omitted if a sufficiently rapid A/D converter is used.

I claim:

1. In a base station for a radio system having apparatus for monitoring radio link quality between the base station and at least one mobile radio station by transmitting a test signal from the base station to the mobile radio station, retransmitting from the mobile radio station back to the base station a response signal based on the test signal as received by the mobile radio station, and determining signal-to-noise ratio of the response signal as received by the base station, an apparatus improvement for ensuring that signal strength of the test signal remains within preselected limits and thereby has a given range of effect on the frequency range of said test signal and, therefore, on the signal-to-noise ratio of the response signal as received by the base station, said apparatus improvement comprising:

a signal generator for generating a baseband supervising signal having a desired baseband frequency;

a measuring device for monitoring signal strength of said baseband supervising signal;

a frequency modulator for frequency-modulating said baseband supervising signal on a radio-frequency carrier and for transmitting a modulated test signal thereby produced, for reception by the mobile radio station;

a receiver for detecting the response signal transmitted by the mobile radio station based on reception at the mobile radio station of said modulated test signal;

said measuring device comprising an A/D converter effectively coupled to said signal generator for obtaining time-spaced digital samples indicative of signal strength of said baseband supervising signal;

a memory device effectively coupled to said measuring device for storing at least one reference correlation between signal strength of said baseband supervising signal, and a preselected desirable frequency deviation of said modulated test signal;

a signal processor effectively coupled between said A/D converter and said memory device, for comparing said digital samples with said at least one reference correlation; and an alarm device effectively included in said signal processor for providing an alarm when comparisons provided by said signal processor indicate that signal strength of said baseband supervising signal correlate to a frequency deviation of said modulated test signal which differs by a preselected excessive amount in relation to said at least one reference correlation.

2. The base station apparatus improvement of claim 1, further including:

said signal processor automatically adjusting said signal generator for tending to cause signal strength of said baseband supervising signal to correlate in said signal processor to a frequency deviation of said modulated test signal which does not differ by as much as said preselected excessive amount in relation to said at least one reference correlation.

3. The base station apparatus improvement of claim 2, further including:

a modulation analyzer effectively coupled to said frequency modulator and to said memory device via said signal processor, for determining, and for storing in said memory device, each of said at least one reference correlation.

4. The base station apparatus improvement of claim 3, wherein:

said modulation analyzer is remotely operable for redetermining, and for updating in said memory device from remotely of said base station, each of said at least one reference correlation.

5. In a radio system, base station apparatus for monitoring the quality of a radio link between a base station and one or more mobile radio stations during normal operation of the base station, said base station apparatus comprising:

a signal generator for generating a baseband test signal having a desired baseband frequency;

means for frequency-modulating said baseband test signal on a radio-frequency carrier and for transmitting the resulting signal as a frequency-modulated test signal;

a transmitter for transmitting said frequency-modulated test signal to said one or more mobile radio stations;

an A/D converter, coupled to said signal generator, for generating digital sample values based on said baseband test signal;

memory means for storing first and second limit values, corresponding to baseband test signal levels causing the smallest and largest allowed frequency deviations, respectively, in said frequency-modulated test signal as transmitted by said transmitter;

means for comparing said digital sample values outputted from said A/D converter, with said first and second limit values; and means for generating an alarm signal in the base station upon detecting that said digital sample values are not between said first and second limit values.

* * * * *